United States Patent [19]

Sederquist

[11] Patent Number: 5,470,360
[45] Date of Patent: Nov. 28, 1995

[54] FUEL CELL POWER PLANT REFORMER BURNER GAS FLOW CONTROL SYSTEM

[75] Inventor: Richard A. Sederquist, Newington, Conn.

[73] Assignee: International Fuel Cells Corporation, South Windsor, Conn.

[21] Appl. No.: 209,043

[22] Filed: Mar. 10, 1994

[51] Int. Cl.⁶ .................................. B01J 7/00; B01J 8/06
[52] U.S. Cl. .............................. 48/94; 48/127.9; 422/197; 422/204; 422/205
[58] Field of Search ....................... 48/127.9, 94; 429/17, 429/19; 422/204, 205, 200, 201, 202, 203, 197

[56] References Cited

U.S. PATENT DOCUMENTS

| | | | |
|---|---|---|---|
| 4,071,330 | 1/1978 | Sederquist | 48/96 |
| 4,098,587 | 7/1978 | Krar et al. | 48/94 |
| 4,292,274 | 9/1981 | Faintani et al. | 48/94 |
| 4,820,314 | 4/1989 | Cohen et al. | 48/94 |
| 4,904,455 | 2/1990 | Karafian et al. | 422/205 |
| 4,921,680 | 5/1990 | Bonk et al. | 48/127.9 |
| 5,264,008 | 11/1993 | Corrigan | 48/94 |
| 5,275,632 | 1/1994 | Corrigan | 48/127.9 |

*Primary Examiner*—Peter Kratz

[57] ABSTRACT

The fuel gas reformer of a fuel cell power plant is provided with burner gas flow baffles which are annular in configuration, and which are concentric with the axis of the burner tube. The annular burner gas flow baffles form annular burner gas flow passages. The reformer has a plurality of annular arrays of catalyst filled tubes disposed in concentric rings about the burner tube. Each of the adjacent catalyst tube rings is separated from the next filled tube ring by one of the annular baffles. Burner gases are deflected downwardly and outwardly by the reformer housing top piece onto the catalyst filled tube rings. The baffles prevent inward flow of the burner gases and direct the burner gases uniformly downwardly along the catalyst filled tubes. Each ring of catalyst filled tubes is thus properly heated so as to enhance reforming of the fuel gas reactant.

2 Claims, 2 Drawing Sheets

FUEL CELL POWER PLANT REFORMER BURNER GAS FLOW CONTROL SYSTEM

DESCRIPTION

1. Technical Field

This invention relates to fuel cell power plant steam reformers, and more particularly to hydrocarbon gas steam reformers which have provisions for more evenly distributing hot burner gas streams over the catalyst tubes in the reformer housing to provide homogeneous heating of the catalyst tubes.

2. Background Art

Hydrocarbon fuel reformers which are used in fuel cell power plant assemblies take a raw hydrocarbon fuel such as natural gas, propane or naphtha and catalytically steam reform the raw fuel to a hydrogen-rich fuel gas suitable for use as an anode fuel for the fuel cells in the plant. The raw fuel is typically percolated through catalyst beds which are contained in tubes mounted in the reformer housing. The catalytic steam reforming conversion process is carried out at elevated temperatures in the range of about 800° F. to about 1600° F. whereby the reformer housing will include a burner which is operated to maintain the aforesaid elevated temperatures. The maintenance of accurate controls for providing even heating of the many catalyst tubes found in the reformer housing is very important to efficient and extended operation of the reformer. The interior of the housing, as noted, is heated with one or more burners and care must be taken to ensure that each of the catalyst tubes in the housing will be maintained at the proper operating temperature. If the temperature in the catalyst tubes is too low, then the conversion reaction will not proceed to the desired degree, and if the temperature in the catalyst tubes is too high, the catalyst and tubes will degrade faster with time.

It is known to utilize up-fired reformer burners and burner tubes so that the heated burner gases will be expelled upwardly out of the burner tube and then swirled back downwardly by the top surface of the reformer housing onto the tops of the conversion tubes. U.S. Pat. No. 4,820,314 to R. Cohen, et al. discloses such an upfired fuel gas reformer. The object of swirling the heated burner back down onto the tops of the conversion tubes is to create a downwardly directed stream of heated gases that will flow evenly down over each of the conversion tubes to provide even heating of the latter. The problem is that the swirling burner gases which are deflected down off of the reformer housing top surface will tend to vector back in toward the center of the reformer housing and then recirculate back up toward the reformer housing ceiling, so that the tubes in the different annular tiers of the tubes will not be evenly heated. The radially outward tiers will be heated to higher temperatures than the inner tiers since burner heat will be given up to the outer tiers before the burner gas reaches the inner tiers. This uneven heating of the conversion tubes is an undesirable operating condition since the outer tiers can be overheated and damaged while the inner tiers receive insufficient heat.

DISCLOSURE OF THE INVENTION

This invention relates to a fuel cell power plant reformer which has provisions for evenly distributing the heated combustion gases over all of the conversion tubes in the several annular tiers thereof. The reformer includes a housing with a rounded or dome-shaped top or ceiling. The fuel conversion tubes are typically arranged in the reformer housing in concentric tiers, rows or rings which are arrayed about, and concentric with a central up-fired heating tube. The heating tube receives hot gases from a burner below the reformer housing. The dome-shaped ceiling deflects the rising heated gases downwardly and outwardly onto the tops of the conversion tubes. An annular fence-type baffle is interposed between each ring of converter tubes and the next adjacent tube rings. The baffles will intercept any portions of the deflected heated gas stream which are flowing back toward the center of the reformer housing, and will redirect the heated gas stream downwardly and uniformly into each converter tube ring. The converter tubes will thus be evenly heated from top to bottom; and each of the tube rings will be substantially evenly heated so that the tubes in the reformer housing are all more evenly heated than with the system disclosed in the aforesaid U.S. Pat. No. 4,820,314. For purposes of completeness of disclosure of the general principles of the manner of operation of fuel cell power plant reformers, the aforesaid U.S. Pat. No. 4,820,314 is incorporated herein in its entirety.

It is therefore an object of this invention to provide a fuel cell power plant reformer assembly which ensures even distribution of reforming heat within the reformer housing.

It is a further object of this invention to provide a reformer assembly of the character described wherein burner gas flow streams are directed evenly through the reformer housing.

It is another object of this invention to provide a reformer assembly of the character described wherein the burner gas flow stream is directed downwardly along catalyst converter tubes so as to evenly heat the latter from bottom to top.

These and other objects and advantages of the invention will become more readily apparent from the following detailed description of a preferred embodiment of the invention when taken in conjunction with the accompanying drawings in which:

BEST MODE FOR CARRYING OUT THE INVENTION

Figure 1:
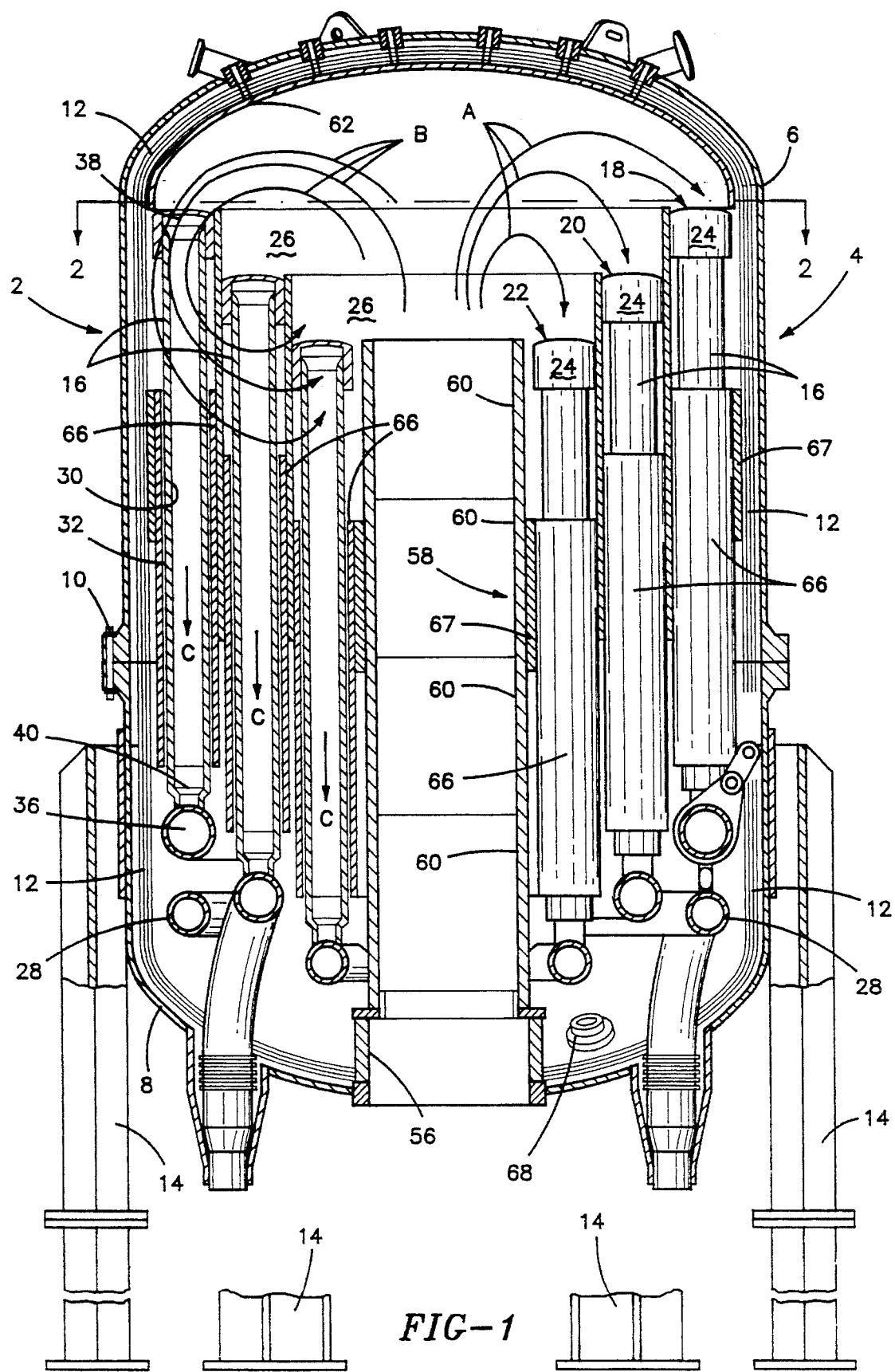
FIG. 1 is an axial sectional view of a preferred embodiment of a reformer formed in accordance with this invention.
Figure 2:
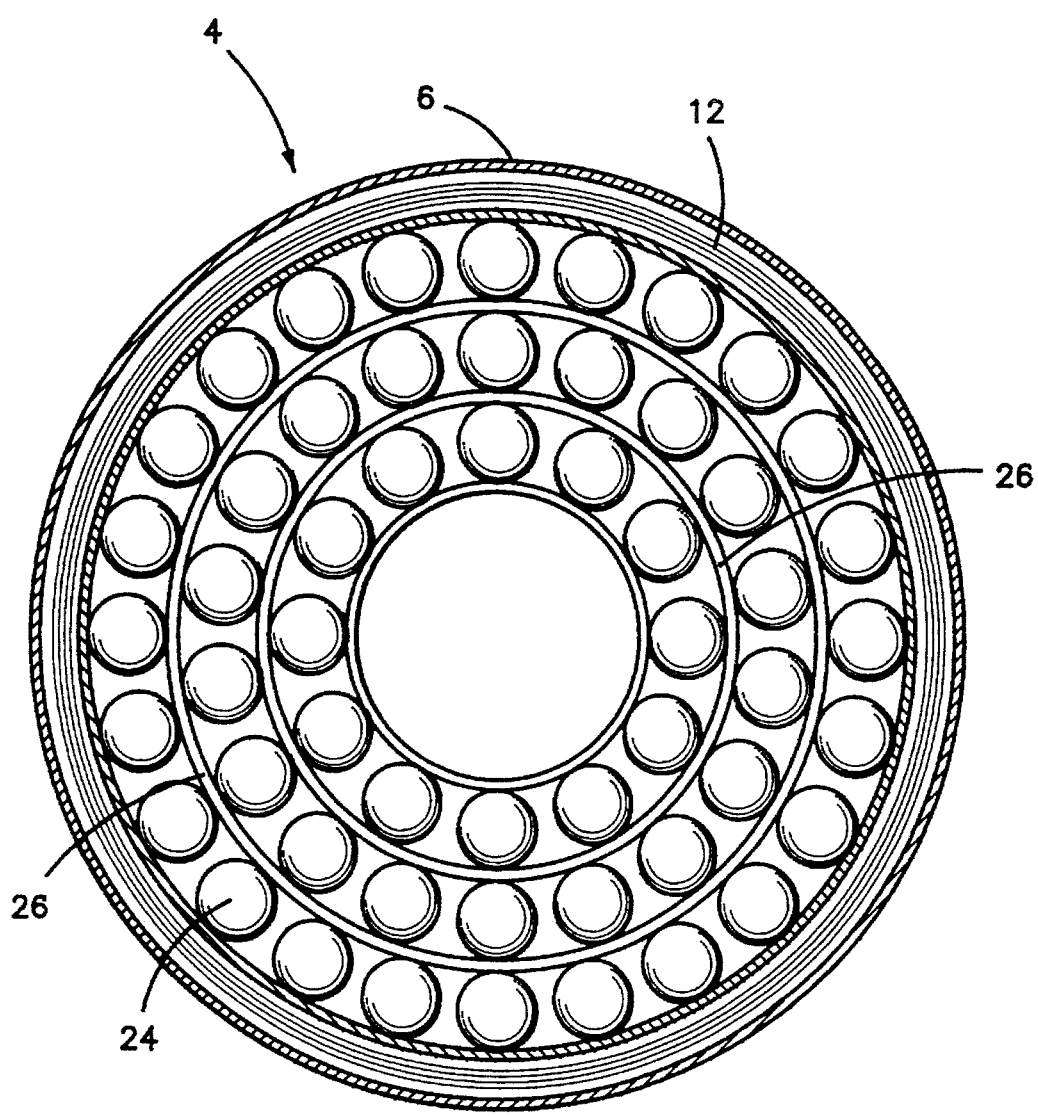
FIG. 2 is a sectional view of the reformer taken along line 2—2 of FIG. 1.

Referring now to the drawings, there is shown in FIGS. 1 and 2 a preferred embodiment of a reformer denoted generally by the numeral 2. The reformer 2 has a vessel housing 4 which comprises a top piece 6 and a bottom piece 8 connected together by a plurality of circumferentially spaced bolts 10. The interior of the vessel housing 4 is lined with thermal insulation material 12. A plurality of legs 14 are secured to the housing 4 to elevate the latter from the ground or floor. A plurality of reformer or catalyst tubes 16 are mounted in the vessel housing 4 in annular rings 18, 20 and 22 concentrically disposed about the vertical axis of the vessel housing 4. The tops of each of the reformer tubes 16 is fitted with a ceramic insulating cap 24.

Each of the reformer tubes 16 receives a stream of raw fuel from the fuel inlet manifold 28. Inside each of the reformer tubes 16 is a smaller exhaust tube 30 which extends for the major portion of the length of the reformer tubes 16. Between the outside of the exhaust tube 30 and the inside of the reformer tube 16 is an annular free space 32 which the catalyst pellets are packed. An annular manifold 36 is disposed below the catalyst-filled free space 32, the manifold 36 being operable to receive reformed fuel from the exhaust tubes 30. The raw fuel percolates up through the catalyst bed until it reaches the uppermost area 38 of the tubes 16 which is inside of the caps 24.

The burner (not shown) is disposed within the cylindric burner housing 56 on the axis of the vessel housing 4 and is an up-fired burner. The burner is thus in the center of each of the tube tiers 18, 20 and 22. A frame and ceramic hot burner gas vectoring tube 58 is mounted above the burner and burner housing 56 and extends upwardly toward the top of the vessel housing 4. The hot burner gas tube 58 is preferably made up of subsections 60 so that its length may be varied if desired. In the embodiment shown, the tube 58 is the same height as the top of the inner tier 22 of the reformer tubes 16. A relatively long burner tube is desirable so that the hot gases remain radially confined until they are relatively close to the top of the housing 4.

The burner gas tube 58 will be long enough to ensure complete combustion and mixing of the burner fuel within the tube 58, and also to ensure that little or no heat is transferred laterally from within the tube 58 to the inner ring 22 of catalyst tubes 16 which is disposed closely adjacent to the burner gas tube 58. Thus, the burner gas tube 58 will be at least as long as a majority of the length of the catalyst tubes 16, and preferably will be approximately the same length as the catalyst tubes 16. Mounted on the inside of the top of the housing 4 is an impingement board 62 which extends down to approximately the level of the top of the highest tier 18 of the reformer tubes 16. The impingement board 62 is made from a heat resistant ceramic material. The hot gases issuing from the mouth of the tube 58 impinge upon the dome-shaped board 62 where they are deflected radially outwardly through a full 180° arc. The hot gases flow downwardly in the vessel housing 4 and between the tubes 16. Each of the tubes 16 has a ceramic heat transfer sleeve 66 mounted about its lowermost portion. The sleeves 66 are formed with internal helical rifling-grooves which form passages for conducting the hot gases down along the outside of the tubes 16. This increases the heating capabilities of the hot gases and also contributes to evenness of the heating of the tubes 16. The outside passages around these sleeves are packed with insulation 67 and sealed to prevent bypass of hot gases around the sleeves. The hot gases upon reaching the bottom of the vessel housing 4 are exhausted therefrom through exhaust ports 68 from whence they are ducted to other parts of the power plant.

In order to ensure even distribution of heat to the reformer tubes, there is provided a plurality of annular baffles 26 interposed between each ring of catalyst filled tubes 16. The baffles 26 extend upwardly toward the housing ceiling 62 approximately as high as the ceramic caps 24 on the catalyst filled tubes 16. This relationship tends to establish annular burner gas flow paths of the type defined by arrows A shown on the right hand side of FIG. 1; and will tend to prevent undesirable recirculation or upswirling burner gas flow paths of the type indicated by arrows B shown on the left hand side of FIG. 1. As a result, the burner gases will flow downwardly along the outside surfaces of the catalyst tubes 16 as indicated by the arrows C in FIG. 1. The burner gas flow pattern indicated by arrows A and C in FIG. 1 provides for a more evenly heated reaction zone and produces more efficient fuel conversion with extended equipment life.

It will be readily appreciated that the fuel cell power plant reformer assembly of this invention can be easily produced and will provide for improved reaction heat distribution throughout the reformer housing. More efficient and complete fuel conversion will result, and there will be a minimum of localized equipment hot spots produced in the reformer. The equipment will therefore have a longer useful operating life.

Since many changes and variations of the disclosed embodiment of the invention may be made without departing from the inventive concept, it is not intended to limit the invention otherwise than as required by the appended claims.

What is claimed is:

1. A catalytic reformer assembly for converting raw hydrocarbon fuel to a hydrogen-rich gaseous fuel for use in a fuel cell power plant, said reformer assembly comprising:
    a) a housing having a cylindrical side wall, a first dome-shaped end wall, and a second end wall opposite said first wall;
    b) a burner in said housing positioned coaxially with said housing side wall, said burner opening through said housing second wall and including a hot gas tube which extends toward said first wall of said housing;
    c) a plurality of catalyst filled tubes disposed in said housing, each of said catalyst filled tubes having a first closed end directed toward the dome and an opposite second end, said catalyst filled tubes being arranged in a plurality of circular arrays each of which is concentric with said burner, said arrays being disposed in rings; and
    d) annular baffles comprising vertically extending cylindrical walls, each extending upwardly toward the dome-shaped end wall and arranged concentric with said burner, and interposed between said rings of catalyst filled tubes, said baffles being operable to intercept hot burner gases deflected from said dome-shaped end wall toward said second end wall, and to direct said hot burner gases away from said hot gas tube, and distribute said hot gases evenly through said rings of catalyst tubes toward said second end wall.

2. The reformer assembly of claim 1 wherein each of the said baffles includes an end edge which is contained in an imaginary plane which contains endmost points of an adjacent outer ring of catalyst filled tubes.

\* \* \* \* \*